United States Patent
De La Torre

(10) Patent No.: US 6,507,666 B1
(45) Date of Patent: Jan. 14, 2003

(54) METHOD AND APPARATUS FOR COMPENSATING FOR DOT GAIN IN STOCHASTIC PRINTING

(76) Inventor: Jesus Hill De La Torre, Justo Sierra 2387, Guadalajara, Jalisco 44680 (MX)

(*) Notice: Subject to any disclaimer, the term of this patent is extended or adjusted under 35 U.S.C. 154(b) by 0 days.

(21) Appl. No.: 09/314,861

(22) Filed: May 19, 1999

(51) Int. Cl.⁷ ............... G06K 9/00; G06K 9/32; G06K 9/40; G03F 3/08; H04N 1/40

(52) U.S. Cl. ............ 382/167; 382/299; 382/163; 382/162; 382/298; 382/254; 382/275; 358/518; 358/537; 358/534; 358/536; 358/459; 358/528

(58) Field of Search ............................. 382/162, 163, 382/165, 167, 175, 178, 275, 298, 299, 254; 358/505, 506, 515–518, 512, 536, 526, 528, 537, 538, 540, 456, 534, 535, 459

(56) References Cited

U.S. PATENT DOCUMENTS

| | | | | |
|---|---|---|---|---|
| 5,640,254 A | * | 6/1997 | Sexton | 358/536 |
| 5,872,896 A | * | 2/1999 | Li et al. | 395/109 |
| 6,118,935 A | * | 9/2000 | Samworth | 395/109 |

* cited by examiner

Primary Examiner—Phuoc Tran
Assistant Examiner—Amir Alavi
(74) Attorney, Agent, or Firm—Christensen O'Connor Johnson Kindness PLLC

(57) ABSTRACT

A method of compensating for dot gain in printing with stochastic screens comprises obtaining continuous tone CMYK files and screening the files at a resolution that is lower than the resolution of an output device that will be used to print the files. The lower resolution stochasticly screened files are then expanded to the resolution of the output device, thereby effectively increasing the size of the dots by creating a number of subdots for each dot in the lower resolution stochasticly screened files. Subdots within the expanded stochasticly screened files can then be selectively removed to compensate for dot gain. In addition, overlapping dots in the screened CMYK files are removed and additional stochasticly screened files are created that print a dot of a color of the previously overlapping dots and at the location of the previously overlapping dots to prevent colors from running together when printing on certain media. Finally, the removal of subdots in the expanded CMYK files can be performed to correct the color of the images when the expanded stochasticly screened file is printed.

14 Claims, 6 Drawing Sheets

50% SCREEN

50% SCREEN WITH 20% DOT GAIN COMPENSATION

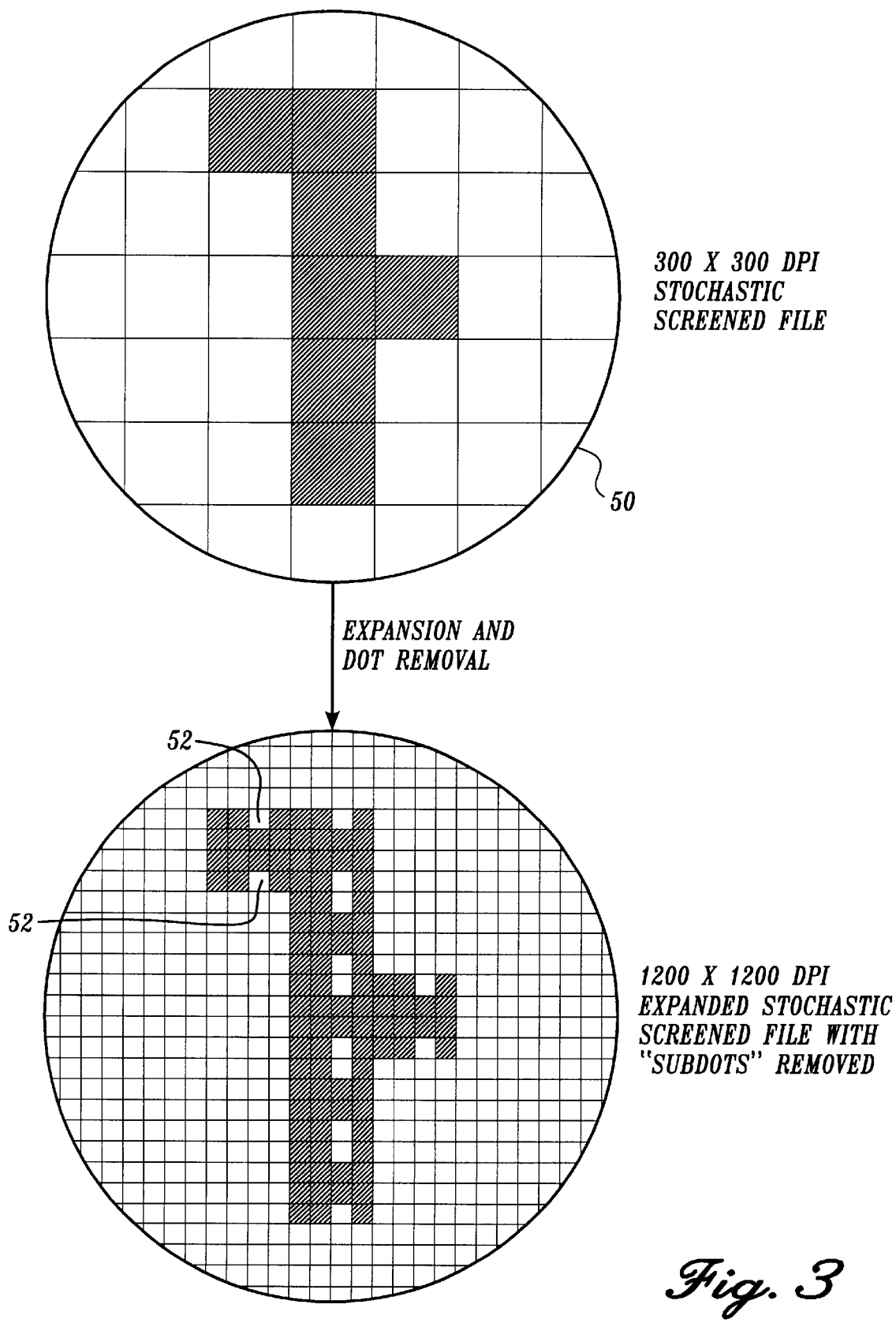

OVERLAPPING DOTS IN CMYK FILES

METHOD AND APPARATUS FOR COMPENSATING FOR DOT GAIN IN STOCHASTIC PRINTING

FIELD OF THE INVENTION

The present invention relates to printing methods in general, and in particular to methods for compensating for dot gain without decreasing tonal range or losing detail.

BACKGROUND OF THE INVENTION

One of the most common artifacts that occurs in printing is dot gain. Dot gain occurs when the size of an ink dot that is printed on a media such as paper, fabric, aluminum, plastic, etc. is larger than desired. Dot gain can occur due to the compression of ink as it is pressed onto the media as well as by the spreading of the ink when absorbed by certain media such as news print, etc. In addition, dot gain can occur as a result of flaws in output devices using the printing process.

Because smaller dots are affected by dot gain more than larger dots, the artifact is particularly noticeable in stochastic screening whereby all the dots that comprise the images are the same size and relatively small. In the past, most methods of compensating for dot gain involved the redistribution and/or removal of a number of dots that are printed. However, the redistribution and/or removal of dots generally reduces the number of dots per unit area, thereby causing a corresponding loss of detail and diminishing the tonal range in the resulting image.

Given the problems associated with dot gain in stochastic printing, there is a need for a mechanism that can compensate for dot gain without removing detail and/or tonal range from an image.

SUMMARY OF THE INVENTION

To address the problems caused by dot gain in printing that utilizes stochastic screens, the present invention comprises a method of creating stochastic screens wherein the size of the individual dots in the screens are modified to compensate for dot gain that occurs during the printing process.

Continuous tone cyan, magenta, yellow and black (CMYK) images are received at a first resolution. A CMYK continuous tone image is applied to a screening program that creates stochastic CMYK files at the first resolution. The CMYK files are then expanded to the resolution of an output device that will print the image. As a result of the integer expansion, each dot in the original stochastic screen file will be represented as multiple subdots in the expanded stochastic screen file. One or more of the multiple subdots that correspond to each dot in the original stochastic screen file are removed to compensate for dot gain that occurs when the expanded stochasticly screened images are printed. In addition, the removal of some of the subdots aids linearization by improving the tonal range.

According to another embodiment of the invention, the system determines when dots in the original stochastic screen files overlap to create a particular color. These dots are then removed from the original stochasticly screened files and additional screen files are added that print dots with the color and the location of the previously overlapping dots.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 3 and 3A illustrate a method in which dots in a lower resolution stochastic screen file are expanded to create a number of subdots and a portion of the subdots are removed to compensate for dot gain, according to the present invention;

DETAILED DESCRIPTION OF THE PREFERRED EMBODIMENT

As indicated above, the present invention is a method for compensating for dot gain in printing methods that use stochastic screens.

Figure 1:
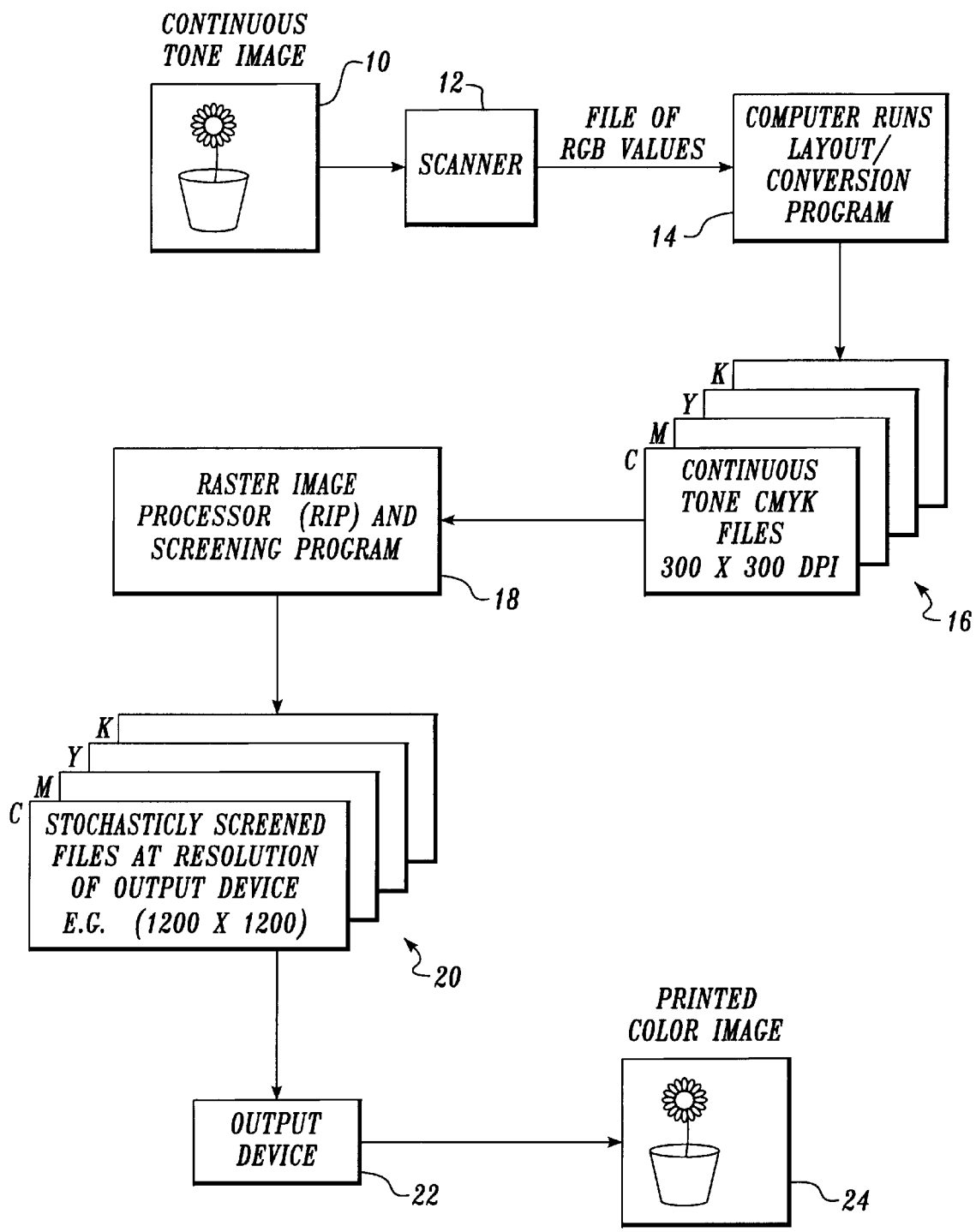
FIG. 1 is a block diagram of a conventional stochastic screening process.

FIG. 1 illustrates a conventional printing system that utilize stochastic screens. A continuous tone image 10, such as a photograph, is applied to a scanner 12 that converts the continuous tone image into a series of RGB values that can be displayed on a computer screen. The RGB values are applied to a computer 14 that runs a layout program that allows an operator to adjust the position of the photograph on a page, add text, etc., and otherwise prepare a document for printing. The computer system also runs a conversion program that converts the RGB values into a series of continuous tone grey scale files that represent cyan, magenta, yellow and black (CMYK). The continuous tone files for each color typically have the same resolution as the RGB files produced by the scanner 12.

In order to print the continuous tone CMYK files 16, the CMYK files 16 are applied to raster image processor (RIP) and a screening program 18. In conventional printing with stochastic screens, the RIP increases the resolution of the continuous tone files to the resolution of an output device that will be used to produce bit mapped files used in the printing process. The increased resolution is obtained by scaling up the continuous tone CMYK files depending on the resolution of the output device. For example, if a continuous tone CMYK file has a resolution of 300×300% pixels per inch and the output device has a resolution of 2400×2400 dpi, then the continuous tone CMYK file would grow 64 times to match the output device resolution. After increasing the resolution of the continuous tone CMYK files, the screening program converts the individual CMYK pixels into a stochastic pattern of dots in accordance with the intensity of each of the CMYK pixels. The output of the RIP and the screening program 18 are a series of bit mapped CMYK stochastic screen files 20 having a resolution equal to the resolution of the output device. The high resolution stochastic screen files 20 are then applied to the output device such as a printer 22 that produces a color image 24 from the bit-mapped files.

As indicated above, one of the most typical artifacts that occurs with printing is dot gain. Dot gain occurs when the size of the ink dot placed on the media on which the image is to be printed is different (usually larger) than the size of the ink dot requested. For example, when the ink is pressed onto the printing media, the compression causes the ink to expand. In addition, the ink may soak into certain types of media, such as newsprint, thereby increasing the size of the dots produced.

In conventional printing using stochastic screens, dot gain is estimated by printing a test image, measuring the size of the dots produced with a densitometer and then adjusting the high resolution stochastic CMYK files to compensate for any dot gain. Such compensation typically involves the removal and/or rearrangement of dots from the stochastic screen files. Because the continuous tone CMYK files are expanded prior to conversion into stochastic screen files, removal of dots from the stochastic screen files causes a corresponding reduction in the level of detail and tonal range in the final printed image.

Figure 2:
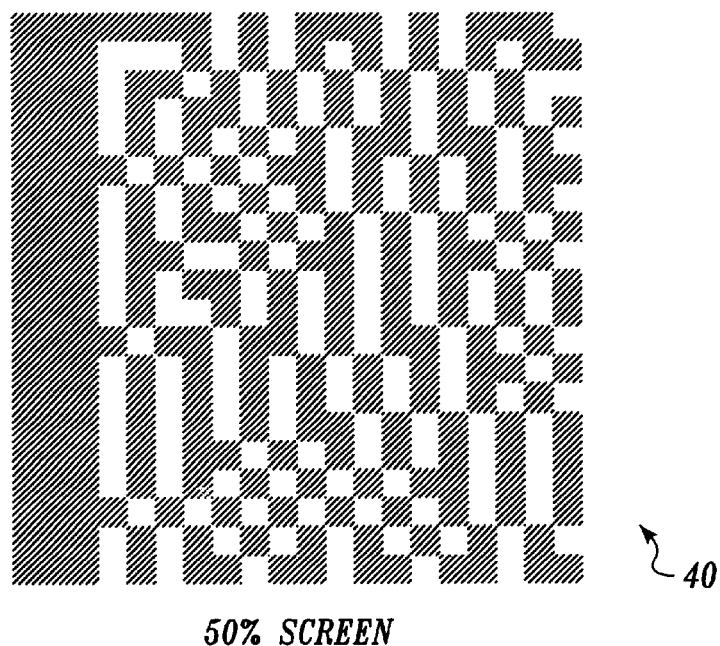
FIG. 2 illustrates a conventional method of compensating for dot gain by the removal and rearrangement of dots.
Figure 2:
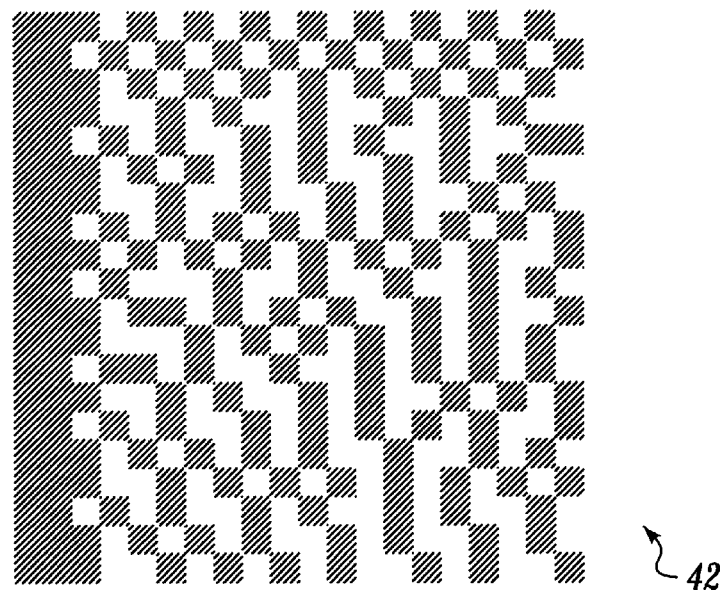

FIG. 2 illustrates a conventional method of compensating for dot gain in a stochastic screen. An image 40 represents a portion of a stochastic screen at a 50% grey scale value. An image 42 represents a portion of a stochastic screen with a 50% grey scale value with a number of dots removed to compensate for a 20% dot gain. As can be seen by viewing the two images 42 and 40, some of the dots in the image 40 are removed from the image 42 and the pattern of dots has changed. The removal of dots and the modification in their position results in a loss of information and detail in the image that is eventually printed.

In contrast to the conventional method of compensating for dot gain by removal of information from the image, the present invention increases the size of the dots in the stochastic screen files and then reduces the size of the dots to compensate for dot gain. To increase the size of the dots in the stochastic screen files, the present invention screens the continuous tone CMYK files without first increasing their resolution to equal the resolution of the output device. Once the files are screened, then the files are expanded to equal the resolution of the output device. Expanding the screened files effectively makes each dot in the stochastic screen file larger. Subdots, i.e., portions of these larger dots can then be selectively removed to compensate for dot gain. The result of the subdot shaving is a stochastic screen with dots of uneven sizes and shapes.

FIG. 3 illustrates a portion 50 of a stochastic screen file at a relatively low, e.g., 300×300 dpi resolution. If the file were expanded to a 1,200×1,200 resolution, then each dot in the portion 50 would be expanded to be 16 "subdots" in the expanded file. With 16 subdots in the expanded file representing a single dot in the lower resolution stochastic screen file, certain subdots 52 can be removed from the expanded file to compensate for dot gain. The particular subdots which are removed can be selected by a user through a computer interface which allows a user to select which subdots are removed. In the presently preferred embodiment of the invention, subdots are generally removed from the periphery of the cluster of subdots to compensate for the expansion of the ink that occurs with dot gain. Because the removal of some subdots from the expanded stochastic screen file does not correspond to the removal of an entire dot in the lower resolution stochastic screen file, the resulting images do not exhibit a corresponding loss of detail.

Figure 3A:
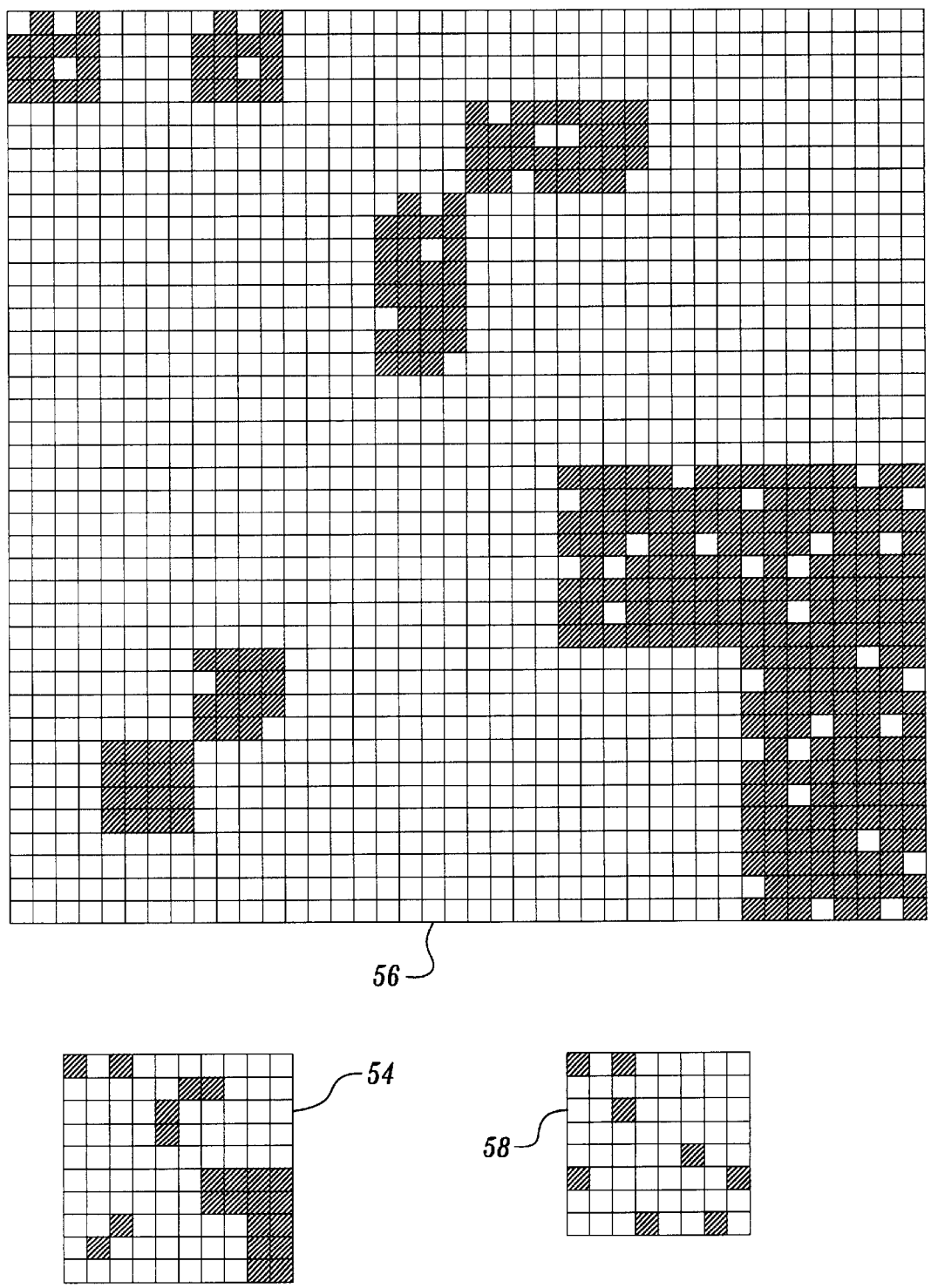

In the example shown in FIG. 3, the same subdots are removed from each cluster of subdots. However, this is not necessarily required. FIG. 3A illustrates a portion of a lower resolution stochastically screened file 54. The file can be expanded by four times to create an expanded stochastically screened file 56. In the expanded stochastically screened file 56, each dot in the file 54 is represented as a cluster of sixteen subdots. A mask 58 that is larger than each 4×4 cluster can be defined (in this case the mask is 8×8) having certain subdots removed (as indicated by the black dots). The mask is laid over the expanded stochastically screened file 56 to determine which subdots in the expanded stochastically screened file should be removed.

The particular subdots in the mask that are removed in the mask may be fixed or be random. The use of a mask that is larger than the clusters of subdots allows for a more accurate compensation for dot gain. Not all the dots in the expanded stochastically screened file need to be compensated in the same way. Similarly different patterns or number of subdots may be removed from the different color screens.

Figure 4:
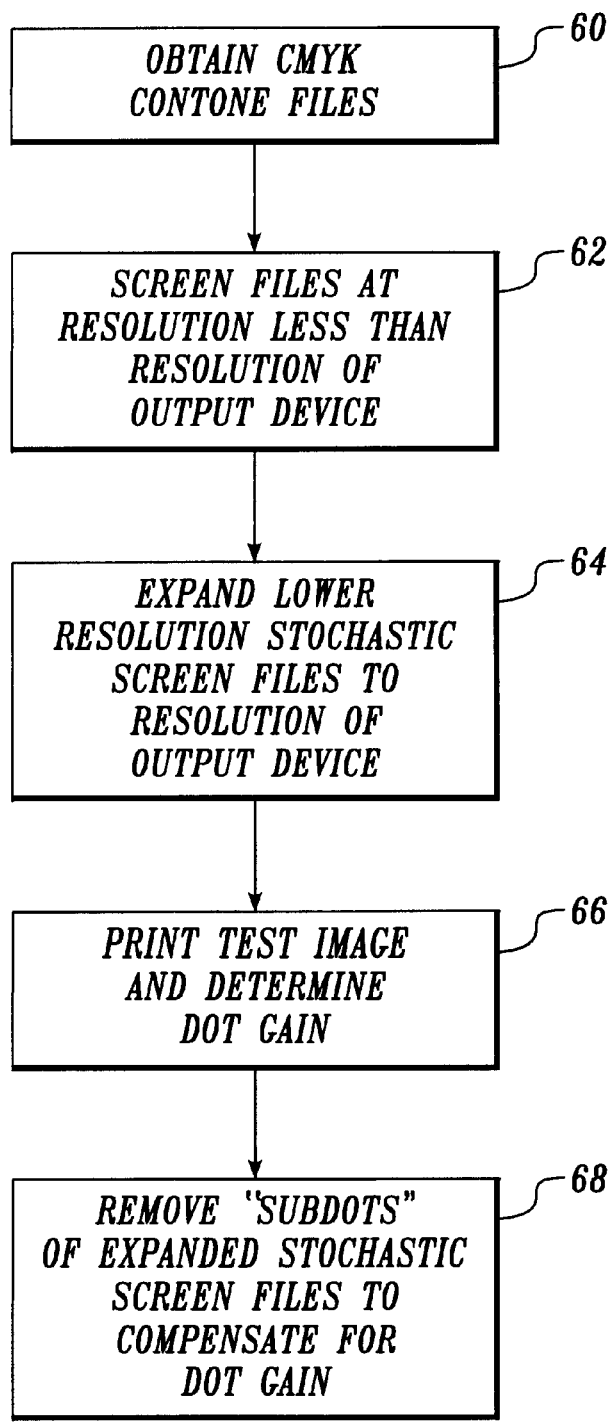
FIG. 4 is a flow chart of the steps performed by the present invention to compensate for dot gain.
Figure 5:
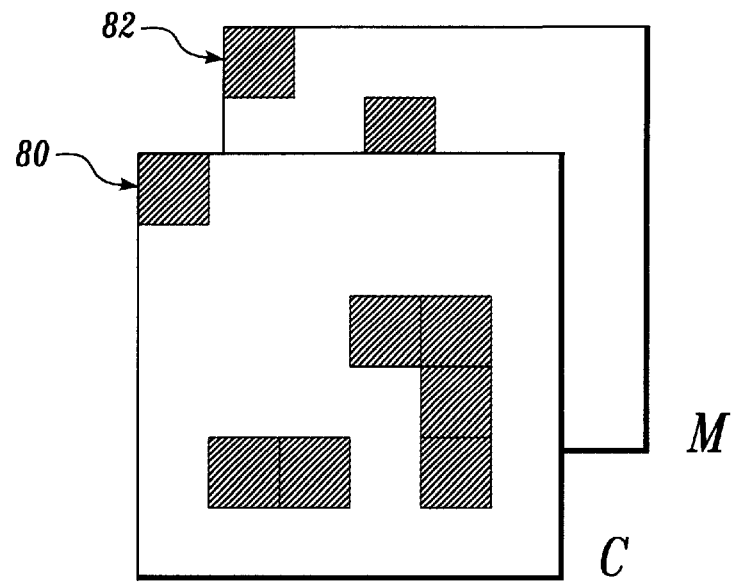
FIG. 5 illustrates a method in which overlapping dots in CMYK stochastic screen files are removed and replaced by additional screens that print a dot of a corresponding color at the location of the overlapping dots, according to another aspect of the present invention.
Figure 5:
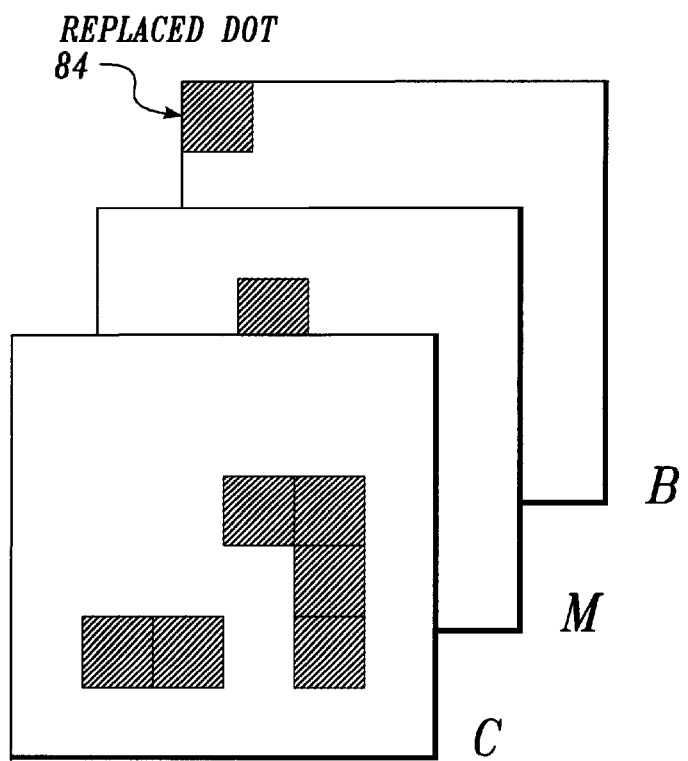

FIG. 4 illustrates a flow chart of the steps performed by the present invention to compensate for dot gain. Beginning at a step 60, the continuous tones CMYK files are created by a scanner or received in a computer-readable form such as from a disk or over a computer network. At a step 62, the continuous tone files are stochasticly screened at a resolution that is less than the resolution of an output device such as a printer, image setter, or other device that will be used to print the images. At a step 64, the lower resolution stochastic screen files are expanded to have a resolution that is equal to the resolution of the output device.

At a step 66, a test image is printed and a densitometer is used to measure the dot gain of the printed image. Once the dot gain has been computed, the expanded stochastic screen files are modified to remove certain subdots to compensate for dot gain at a step 68.

The particular subdots removed from the expanded stochastic screen may be determined with a look-up table based on past experiences with prior printing jobs. Alternatively, certain subdots can be removed and another test image printed to determine if the dot gain has been properly compensated.

Another benefit of the present invention is the ability to control when inks in a printing process are deposited directly over each other. In many printing jobs such as, printing on metal or on absorbent fabric, the deposit of two different colored inks directly over each other creates a muddy or more otherwise blurred image. Therefore, the present invention can analyze the stochastic screen files to determine when dots of different colors are deposited directly over each other. To prevent the blurring, the present invention turns off those overlying dots and replaces them with a dot in another stochastic screen file that will deposit a color equal to the color combination produced by the previously overlapping dots. For example, if a dot in a cyan file overlaps with a dot in a magenta file, the resulting combination should be blue. Therefore, both dots can be removed from the stochastic screen files and an additional screen created having a dot that will deposit blue ink at the location of the previously overlapping dots. When the dots are expanded to have a resolution equal the resolution of the output device that will print the image, subdots in the expanded files can be removed to compensate for dot gain. To prevent colors from running together, at least one full row and one full column of the subdots at the periphery of each cluster should be removed.

Another benefit of the present invention is to perform color calibration for example, if the expected color, in the CMYK color gamut, of the combination of 100% yellow and 100% magenta should be the color red, and if, instead the resulting color at printing that combination is the color orange, then a method for color correction is required. A method of compensating the color according to the present invention is to reduce the amount of yellow color by removing some of the subdots of the higher resolution stochasticly screened yellow file. Therefore the color combination will print the correct color red.

The changes for color compensation are for particular areas of the image, so the entire image has to be analyzed in small portions of the stochastic combinations; unless whole areas of the image are of the same combination CMYK colors, as in the case of spot color simulation through the CMYK color combination.

The embodiments of the invention in which an exclusive property or privilege is claimed are defined as follows:

1. A method of compensating for dot gain in stochastic screen files to be printed on an output device having a predefined resolution comprising:

receiving continuous tone CMYK files at a resolution less than the resolution of the output device;

screening the continuous tone CMYK files to produce stochastic CMYK files at a resolution less than the resolution of the output device;

expanding the stochastic CMYK files to have a resolution that is equal to the resolution of the output device wherein the expansion causes each dot in the stochastic CMYK file to be represented at a number of subdots in the expanded stochastic CMYK file; and selectively removing a number of the subdots in the expanded stochastic CMYK file to compensate for dot gain when the expanded stochastic CMYK files are printed.

2. The method of claim 1, wherein the output device is a printer.

3. The method of claim 1, wherein the output device is an image setter or plate setter that produces films or plates of the expanded stochastic CMYK files.

4. A method of preventing color overlap in stochastic screen printing, comprising:

receiving continuous tone CMYK files;

screening the continuous tone CMYK files to produce stochastic CMYK screen files;

determining if there are overlapping dots in the stochastic CMYK screen files and if so, removing the overlapping dots and adding one or more additional stochastic screen files having dots at the position of the overlapping dots;

expanding the dots in the one or more additional stochastic screen files, so that each dot is comprised of a number of subdots;

selectively removing subdots of the dots in the one or more additional stochastic screen files to compensate for dot gain; and printing colors with the one or more additional screen files that represent the color of the overlapping dots.

5. The method of claim 4, wherein the subdots are removed from a row and a column of a cluster of subdots that correspond to a single dot in the lower resolution stochastic screen file to prevent colors from running together.

6. A method of correcting color in printing that utilizes stochastic screens comprising:

receiving continuous tone CMYK files at a resolution less than a resolution of an output device;

screening the continuous tone CMYK files to produce stochastic CMYK files;

expanding the stochastic CMYK files to have a resolution of the output device, wherein the expansion causes each dot in the lower resolution stochastic screen file to be represented as a number of subdots in the expanded stochastic CMYK file; and selectively removing subdots from the expanded stochastic CMYK file to correct the color when the expanded stochastic CMYK files are printed.

7. A method of printing on metals or cloth comprising:

creating or receiving a number of stochastically screened files, each of which defines a number of dots to be printed;

analyzing the files for overlapping dots in at least a first and a second file that will print a dot of different colors in the same location;

creating one or more additional files with dots positioned to coincide with the position of the overlapping dots, the dots in the one or more additional files printing colors that are different than the colors to be printed with the first and second file;

removing the overlapping dots from the first and second file;

dividing the dots in the one or more additional files into a number of subdots;

selectively removing subdots from the dots in the one or more additional files to compensate for dot gain; and printing the files on metals or cloth with an output device.

8. A method of printing an image with an output device, comprising:

receiving a continuous tone image file;

stoachastically screening the continuous tone image file to produce a number of stochastically screened files each of which includes a number of dots;

expanding the stochastically screened files such that each dot is divided into a number of subdots;

selectively removing subdots from the expanded screen files; and printing the expanded, stochastically screened files on the output device.

9. The method of claim 8, wherein the subdots are removed to compensate for dot gain when the expanded, stochastically screened files are printed.

10. The method of claim 8, wherein the subdots are removed to correct a color of the image when the expanded, stochastically screened files are printed.

11. The method of claim 8, wherein the subdots are removed to prevent color overlap when the expanded, stochastic ally screened files are printed.

12. The method of claim 11, further comprising:

analyzing the stochastically screened files to determine if there are overlapping dots, and if so, removing the overlapping dots and adding one or more stochastically screened files having dots at the position of the overlapping dots;

expanding the dots in the one or more additional stochastically screened files, so that each dot is comprised of a number of subdots;

selectively removing subdots in the one or more additional expanded, stochastically screened files; and printing the expanded stochastically screened files on the output device.

13. The method of claim 12, wherein the output device prints on metal.

14. The method of claim 12, wherein the output device prints on cloth.

* * * * *

UNITED STATES PATENT AND TRADEMARK OFFICE
CERTIFICATE OF CORRECTION

PATENT NO.    : 6,507,666 B1                                               Page 1 of 1
DATED         : January 14, 2003
INVENTOR(S)   : J.H. De La Torre It is certified that error appears in the above-identified patent and that said Letters Patent is hereby corrected as shown below:

<u>Title page,</u>
Item [56], References Cited, insert in appropriate order the following:
 -- FOREIGN PATENT DOCUMENTS
  EP     0 661 869 1      7/1995
  EP     0 734 151 A1    9/1996 --

-- OTHER PUBLICATIONS
International Search Report, International Application
No. PCT/IB00/00660; International Filing Date
05/17/2000, mailed 08/22/2000. --

Signed and Sealed this

Twenty-first Day of October, 2003

JAMES E. ROGAN
*Director of the United States Patent and Trademark Office*